March 15, 1966  A. K. EDGERTON  3,241,036
PHOTOELECTRIC SINE WAVE GENERATOR
Filed Oct. 22, 1962  2 Sheets-Sheet 1

INVENTOR.
ALBERT K. EDGERTON
BY Forrest J. Lilly
ATTORNEY

March 15, 1966 A. K. EDGERTON 3,241,036
PHOTOELECTRIC SINE WAVE GENERATOR
Filed Oct. 22, 1962 2 Sheets-Sheet 2
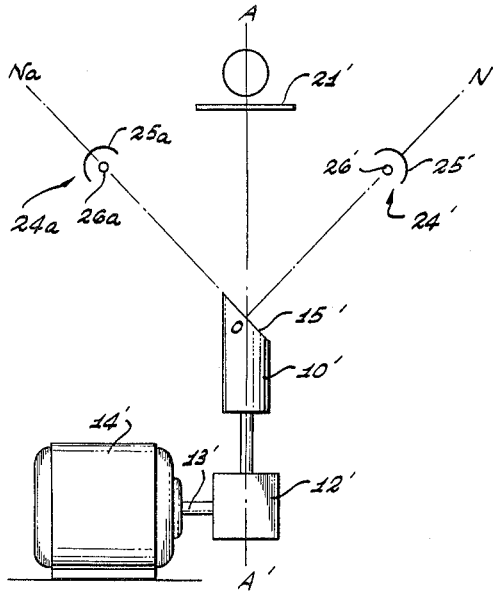
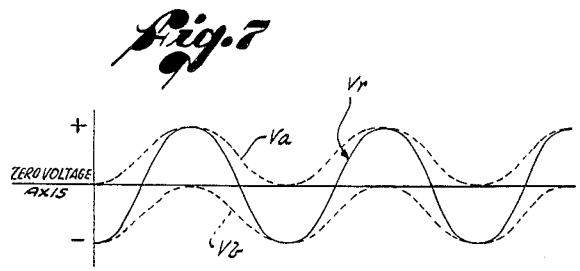
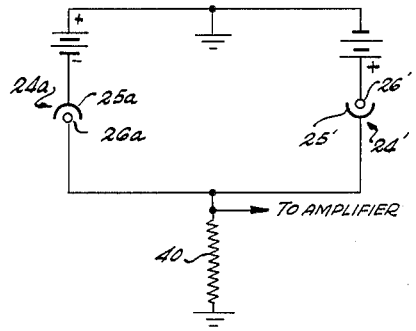
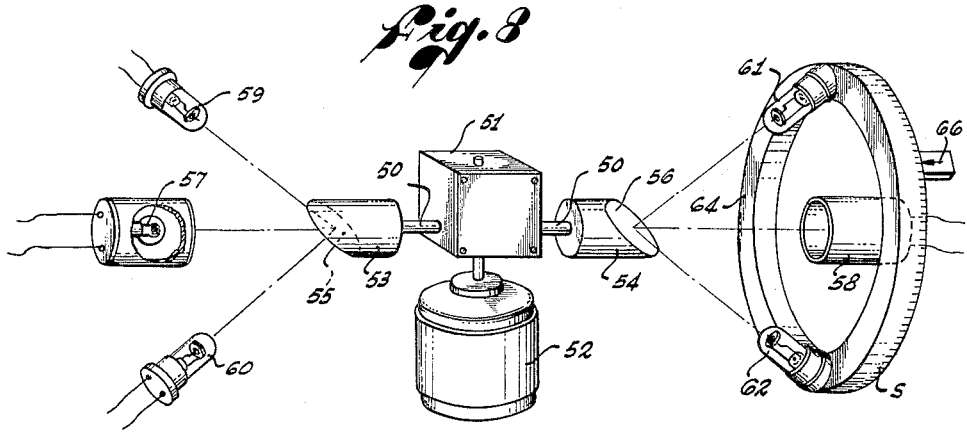
INVENTOR.
ALBERT K. EDGERTON
BY Forrest J. Lilly
ATTORNEY United States Patent Office 3,241,036
Patented Mar. 15, 1966

3,241,036
PHOTOELECTRIC SINE WAVE GENERATOR
Albert K. Edgerton, 9763 Johanna Place, Sunland, Calif.
Filed Oct. 22, 1962, Ser. No. 232,191
13 Claims. (Cl. 321—34)

This invention relates generally to electrical sine wave generators and, more particularly, to improvements in a form of sine wave generator disclosed in my copending application entitled, Photoelectric Signal Generator, filed Aug. 31, 1959, Serial No. 837,248, now Patent No. 3,093,785.

The sine wave generator of the present invention, together with that disclosed in my said copending application, form a new class of generator capable of generating an electrical wave which varies as an almost pure sine function of the angular position of a rotatable shaft, independent of rotational velocity. Output continues, as a sine function of angular shaft displacement, even when the shaft is stationary. The output voltage is a continuous rather than a step function of the angle of shaft rotation. This class of generator may be briefly characterized as comprising a rotatable light emitting surface, rotated by a motor-driven shaft, and a "field" comprised of one or more stationarily mounted photocells which view the rotating light emitting surface in such an aspect that the area of the light emitting surface viewed varies in accordance with the sine of the angle of rotation.

The sine wave generator of the invention, in common with that disclosed in my said copending application, provides a source of sine wave alternating current of very low distortion from zero frequency into the audio frequency range. Frequency, voltage and phase of the generated alternating current can be calibrated directly in terms of readily available and highly precise standards, and these calibrations can be accurately held through the very important but extremely difficult range of .01 to 5 c.p.s. It is known, for example, that the National Bureau of Standards will not, because of the unavailability of satisfactory instrumentation, generally undertake calibration work below 10 c.p.s., while accurate calibrations at frequencies as low as 10 c.p.s. are relatively difficult. While the range of .01 to 5 cycles is of particular interest at the present time, the generator of the invention is equally available and useful from zero to .01 c.p.s.

For frequency calibration purposes, the alternating current output of the sine wave generator of the invention is calibrated in terms of the rotational speed of the shaft of the generator. Use, for example, of a synchronous motor and a suitable transmission for drive of the generator permits calibration for direct frequency readout to the accuracy of commercial power frequency, or an accuracy of at least ±.25%. Calibration of shaft rotational rate against time signals from the National Bureau of Standards affords highly precise standardization of generator frequency.

The attributes of exceedingly low wave form distortion, and that output voltage is independent of generator shaft rotational velocity, make possible the calibration of the alternating current output voltage of the generator in terms of a direct current standard, such as a standard cell. The effective, or root mean square (R.M.S.), value of a pure sine wave is 0.7071 times the maximum value. If the shaft of the generator is rotated to a maximum voltage output and stopped, the shaft will be positioned for either the 90° or 270° peak of the output wave. The output frequency is then zero and the output voltage is D.C. If now the output voltage for this point is calibrated against a D.C. standard, the effective or R.M.S. output voltage of the generator at any frequency has been established as $$E_{eff} = E_{D.C.} \times 0.7071 \text{ volts.}$$

This calibration feature, wherein the generator itself becomes a D.C. to A.C. transfer device, making possible calibration in terms of, say, a National Bureau of Standards certified standard cell, is believed to be a unique attainment. That such calibration can be achieved for the very low frequency spectrum, as 0 to 2 c.p.s, is particularly noteworthy and is in sharp contrast to the materially lower accuracies of voltage measurements made or attempted in this range with the best of equipment of previously known types.

Phase angle measurements made possible by the generator are especially important. The output of the generator is proportioned to the sine of the position angle of the shaft, independent of shaft velocity; and output voltage may be held constant by stopping the shaft at any angle. A condition of zero frequency is thereby established, with a direct current output voltage of $E_\phi = E_{max} \times \sin \phi$ volts ($\phi$ being the angle of shaft displacement from the zero voltage position in a positive direction). After the generator has been calibrated at peak or maximum D.C. output voltage, the voltage for any angle of shaft rotation can then be defined in terms of the above equation. Further, the accuracy of the output voltage can be checked against a D.C. standard. Thus, the output voltage, through one shaft rotation, can be established point-by-point against a standard cell reference, and its deviations from calculated values, i.e., distortion, determined. If peak voltage were set at unity, then the output voltage at any angle would be equal to the sine of the angle, plus or minus errors.

Now consider two generators on a common shaft, each comprised of a rotor having a light radiating surface, and each having a "field" or "stator" comprised of one or more photocells positioned to view the rotating light radiating surface, as before mentioned. Assume that the photocell "field" of one generator is arranged for rotational adjustment about the axis of rotation of the rotor and that a precise angular scale is provided to permit readout of its rotational displacement from a predetermined norm. The phase difference of the two generators can be read on such scale, thus affording a reading of the electrical phase angle in terms of a mechanically standardized scale.

Alternately, suppose it is desired to establish the phase angle between the two generators for any value without use of a mechanical scale. By stopping either generator at a zero output (D.C.) point, the D.C. output of the other generator is proportional to the sine of the phase angle between the generators and is given by the equation $E_\phi = E_{max} \times \sin \phi$ volts, where $\phi$ is the phase angle between the generators. Electrical phase angle can thus be calibrated accurately in terms of a D.C. standard, and this throughout the very frequency range wherein such measurements, with prior methods and instrumentation, are exceedingly difficult, and at very low frequencies, virtually impossible.

The sine wave generator of my aforementioned earlier application is capable of producing a sine wave of less than 2% total harmonic distortion. It uses a ground, or "matte," light radiation or emitter surface on a cylinder of clear, transparent plastic, preferably composed of methyl methacrylate, marketed under the trademark Lucite. This cylinder rotates on an axis bisecting said radiation surface, and the ground surface is illuminated by light transmitted into and through the Lucite cylinder to said radiating surface. The system also uses a pair of photocells facing toward the ground surface but positioned on opposite sides of the axis of rotation, so that each actually views the illuminated ground surface during 180° of rotation. Each photocell produces one-half of the sine wave, and the two half-sine-waves are combined in an output circuit to provide a full sine wave. This system is capable of good performance, but has some practical limitations as regards distortion reduction to the exceedingly low values sometimes desired.

The primary object of the present invention is to provide an improved sine wave generator of the class described, characterized by further substantial reduction in harmonic distortion.

A further object is the provision of such a generator, capable of operation with but a single photocell.

The species of my sine wave generator disclosed in my aforesaid prior application was characterized by location of the axis of rotation of the Lucite cylinder in the plane of the light radiating surface thereof. The generator of the present invention has the light radiating surface on the cylinder at an acute angle to the axis of rotation, as 45° thereto. Preferably, though not necessarily, this surface is illuminated exteriorly, as by light directed parallel to its axis of rotation, and the cylinder, therefore, need not be transparent. The light radiating surface preferably has a non-specular, i.e., dull or matte finish and, for this purpose, may be ground, or suitably painted, as, for example, coated with white paint. Specular reflectivity is by this means minimized. All points on the illuminated matte surface, however, comprise point sources of light, each radiating throughout a hemisphere. The matte surface is thus a radiator of diffused light. For the purpose of this application and the appended claims, the expression "matte surface" denotes a surface which is substantially non-specular as regards its reflectivity characteristics, or which, in other language, exhibits small, if any, mirror type reflectivity; and which may be either internally or externally illuminated, and may have its non-specular characteristic as a result of being ground, coated with a dull paint, or otherwise. Such a surface, it will be understood, radiates light throughout a hemisphere. It will further be understood that some extent of specular reflectivity may be tolerated, or may even be inevitable, but is neither useful nor desirable. The invention, in fact, deliberately locates the photocell or cells out of the path of any specularly reflected light.

Two systems within the scope of the invention will be disclosed, one with a single photocell viewing the radiating surface, located on or near an axis which is normal to the radiating surface in one position of rotation of the latter, and one using two photocells spaced 180° apart with reference to the axis of rotation of the radiating surface, with each on or near an axis which becomes normal to the radiating surface, once during each full rotation of the radiating surface. According to this geometry, the area of the radiating surface viewed by the photocell varies sinusoidally during the rotation of the surface. A sine wave output voltage may be derived from either the one cell system, or the two cell system, as will be explained in more particular hereinafter. The system permits great improvement in wave form distortion. One source of distortion is the sweeping of reflected light from the radiating surface across the photocells, which produces a second harmonic distortion, at a frequency of twice the angular frequency of the generator shaft. The present invention places the photocells well out of the path of material stray or unwanted reflected light from the radiating surface, and thus greatly reduces or virtually eliminates second harmonic distortion. A two photocell system in accordance with the invention has shown a second harmonic distortion down to .02%, third harmonic at .15%, a fourth harmonic at less than .02%, with higher harmonics negligible. In a present actual embodiment of the invention, total harmonic distortion is 0.25%, or less, depending upon care of adjustment, and can be maintained at that exceedingly low level. The voltage output can be calibrated throughout a frequency range from D.C. to power line frequency with an error of no greater than ±0.5%. The amplitude of the output voltage holds to an accuracy of better than ±.5% throughout this frequency range. As a two phase generator, the instrument will produce two sine waves of accurately known phase difference at any phase angle or frequency.

The invention will be better understood from the following detailed description, reference being had to the accompanying drawings, in which:

FIG. 1 is a largely diagrammatic side elevational view of one embodiment of the invention;

FIG. 1a indicates a modification of FIG. 1;

FIG. 5 is a view similar to FIG. 1 but showing a modification;

FIG. 6 shows a typical electrical circuit for the system of FIG. 5;

FIG. 7 is a diagram illustrating the generation of a voltage wave by the system of FIGS. 5 and 6; and FIG. 8 shows diagrammatically a modification of the invention for generation of two voltage waves of any adjusted phase difference.

Figure 1:
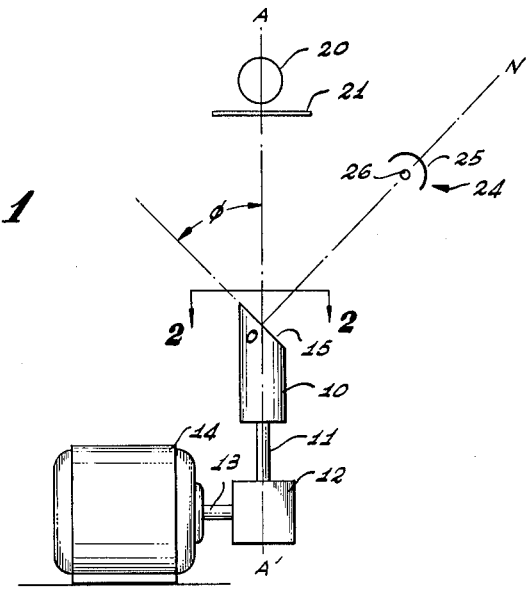
Figure 2:
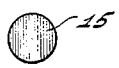
FIG. 2 is a detail view taken on line 2—2 of FIG. 1.

Reference is directed first to the single photo-cell embodiment of the invention disclosed in FIGS. 1–4.

Reference numeral 10 designates a cylinder, rotatable on its central axis A–A' by means of axial shaft 11 fixed to one of its ends. The shaft 11 is here diagrammatically shown as driven through variable speed drive unit 12 from the drive shaft 13 of a synchronous electric motor 14. The cylinder 10 may be composed of any suitable material, such as a suitable plastic, as Lucite, or metal, as steel. The variable speed drive unit 12 should be of a precision type which will assure rotation of shaft 11 and cylinder 10 with a high degree of uniformity, and will not constitute a source of material wave form distortion. A ball and disc integrator may be used. The unit 12, not constituting a part of the present invention, is not necessary to disclose herein.

The end of cylinder 10 opposite from shaft 11 is formed with a plane end surface 15 which is at an acute angle $\phi$ to cylinder rotation axis A–A' and which is symmetrically intersected or bisected thereby. While theoretically this acute angle $\phi$ may be any angle material greater than zero degrees, and any angle materially less than 90°, it is found in practice that an angle $\phi$ of 45°, or in the general vicinity thereof, is ideally adapted to the requirements of the invention.

The surface 15 is formed or coated to have a matte surface. That is to say, the surface 15 is dull, or non-specular, i.e., non-reflective in the sense of a mirror. I have found that a suitable matte surface 15 may be provided by coating the angular end surface of the cylinder 10 with white paint.

Positioned on axis A–A', in line with surface 15, is an illuminant, e.g., a lamp 20, and in front of lamp 20 is any conventional light diffusion plate 21, such that uniformly diffused light from this diffused light source is cast onto and uniformly illuminates the white-paint-coated surface 15. Under these conditions, the matte surface 15 becomes a radiator or emitter of diffused light, rather than a mirror-like reflector. In other words, rather than acting as a light beam reflector, the surface 15 radiates diffused light throughout a complete hemisphere. Each point on surface 15 thus becomes a point source of light, which radiates throughout a hemisphere. The matte surface 15 may, of course, notwithstanding the effort to give it substantially complete non-reflective characteristics, reflect some light from the source, generally along an angle of reflection equal to the angle of incidence of the light with respect to the surface; but any such reflected light will be at an angle to miss the presently described photocell, and thus do no harm.

A normal to the surface 15, intersecting said surface at axis A–A', is indicated at NO; and on this axis, or generally adjacent thereto, preferably a little above it, is a radiant energy receiver, preferably in the form of a photo-cell 24, having photosensitive cathode 25 and anode 26, connected in a suitable circuit, as will presently be described.

It should be evident that the photocell, positioned as described, will view the light radiating surface 15 in its full ellipse aspect in the position of FIG. 1, and that as the cylinder 10 rotates on its axis A–A' from the position of FIG. 1, the elliptical area of surface 15 as viewed by the photocell will gradually become narrower, approaching a line as the cylinder approaches a position rotated 180° from that of FIG. 1. At 180° rotative shaft displacement, the area viewed by the photocell reduces to zero. The total quantity of light reaching the photocell from the surface 15 diminishes correspondingly, and is reduced to zero at the 180° position. The reverse then takes place as the cylinder is rotated on, around and back to its original position of FIG. 1. It will be seen that the area of the light radiating surface 15 as viewed by the photocell varies sinusoidally with the angle of shaft rotation, as, therefore, does the output from the photocell.

Figure 3:
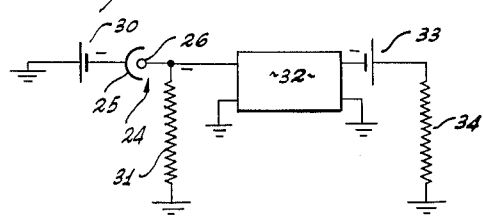
FIG. 3 is a typical electrical circuit for the system of FIG. 1.

FIG. 3 shows a typical output circuit leading from the photocell 24. To the cathode 25 of the latter is connected the negative terminal of battery 30, the positive terminal of which is grounded, as shown. The anode 26 is connected to the negative end of loading resistor 31, the other end of which is grounded. The negative end of the loading resistor 31 is connected to one input terminal of amplifier 32, and to the negative poled output terminal of amplifier 32 (assuming the amplifier to have an even number of stages), there is connected the negative terminal of a biasing battery 33. The positive terminal of battery 33 is shown as connected to one end of output resistor 34, the opposite end of which may be grounded. The biasing battery 33 introduces a necessary bias, as will be described presently. In practice, however, assuming use of a D.C. feedback amplifier at 32, this necessary bias can be advantageously introduced within the amplifier at low impedance, as will be apparent to those skilled in the art.

Figure 4:
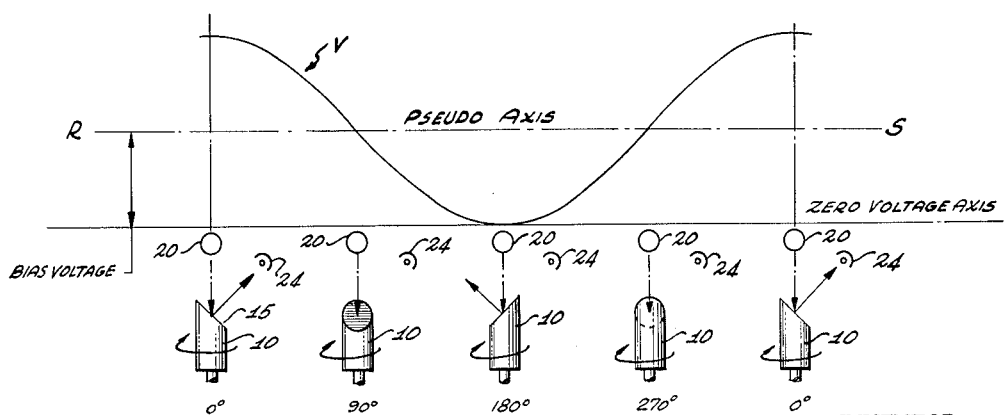
FIG. 4 is a diagram illustrating the generation of a voltage wave by the system of FIGS. 1–3.

The operation of the system will be best understood more fully by referring now to the diagram of FIG. 4, showing progressive positions of the rotating cylinder 10, and the sinusoidal output voltage wave V developed across the loading resistor 31. The cylinder is shown in five positions, at zero degree shaft displacement from the position of FIG. 1, and then at 90°, 180°, 270°, and back to zero.

At the zero degree position, the photocell views the surface 15 in its full or full ellipse aspect, the quantity of light radiated from surface 15 and incident on the photocell is at a maximum, and the photocell output voltage, after amplification, and introduction of a bias voltage, i.e., the voltage developed across the output resistor 34, is at a maximum, as shown.

Figure 1A:
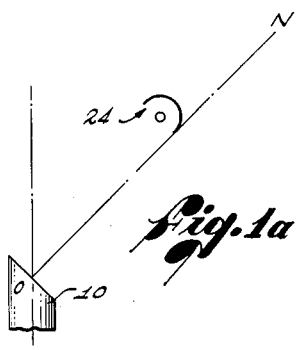

In the 90° position or aspect, the area of the surface 15 as viewed by the photocell is reduced by one half, and at 180° the surface 15 becomes a line, with area of zero, so that, in theory, or in the ideal case, at least, the surface 15 just vanishes from view by the photocell. Actually, owing to necessary physical dimensions of the photocell, and its positioning, the surface will not totally vanish, unless the photocell is placed below the normal axis NO. Clipping is thereby introduced. If, on the other hand, the photocell is placed above the normal axis (FIG. 1a), i.e., inside the cone generated by the normal NO as the cylinder 10 rotates, the surface 15 remains in sight, but is reduced to a minimized viewable area at the 180° position. This condition is preferred to clipping. For the present, however, the description will continue with the ideal case, on the theoretical assumption that the surface 15 just vanishes from the photocell at the 180° shaft displacement position. The voltage wave V developed across the loading resistor is thus reduced precisely to zero.

At 270° of shaft rotation, the surface 15 is again visible to the photocell, but at half area, so that the voltage wave V is again at half its maximum amplitude.

At 360°, conditions are again as at the start.

As stated earlier, the novel geometry of the system is such that the area of the light radiating surface 15, the amount of light received therefrom by the photocell, and the voltage thereby developed across the loading resistor, vary sinusoidally from a maximum through zero and back to a maximum as the cylinder shaft is rotated through 360°. However, the voltage wave V, as developed across loading resistor 31, is sinusoidal but unidirectional (FIG. 4). This voltage wave will be seen to be symmetrical about a pseudo axis RS located at the half of maximum amplitude level of the wave V, consisting of alternating positive and negative half cycles with reference to said axis. Actually, the voltage wave V contains a D.C. component, equal to half the peak-to-peak amplitude of wave V. To obtain a sinusoidal alternating current output voltage wave, as across output resistor 34, with the D.C. component removed, I introduce the aforementioned bias voltage, illustratively by means of the biasing battery 33, with such polarity as to produce a final alternating current output voltage wave which is symmetrical with respect to a zero voltage axis. This requires, as will be seen, the use of a voltage at battery 33 which is equal to the half amplitude of the peak sinusoidal voltage wave output from the amplifier, and which is so poled as to shift the zero axis of that voltage wave to the half amplitude level. As mentioned earlier, this can readily be done by those skilled in the art by suitable arrangements within a D.C. amplifier of the feedback type, such that the output voltage wave from the amplifier is of alternating current character.

In FIG. 5 I have shown a two photocell system, which uses equipment identical to that of FIG. 1, excepting for use of a second photocell. For convenience, all members in FIG. 5 corresponding to members in FIG. 1 will be identified by the same reference numerals, but with primes annexed in the case of FIG. 5, and a detailed description of the arrangement of these members need not be repeated. In the system of FIG. 5, a second photocell 24a is used, having cathode 25a and anode 26a; and this second photocell is located on a normal NaO to surface 15' when the latter is in a position rotated 180° from that of FIG. 5. As described in connection with FIGS. 1 and 1a, the photocells need not be precisely on the normals NO and NaO, and may preferably be above these normals as in FIG. 1a.

In FIG. 6 is shown an illustrative output circuit for the two photocells. The two photocells will be seen to be connected in parallel with one another, but in opposed phase, each in series with a 22½ volt battery 35, with the two parallel photocell and battery circuit branches connected in series with loading resistor 40, which may typically be of a resistance of 20 megohms. The top end of the loading resistor is coupled to an amplifier, not shown.

It will be clear from what has already been described that each photocell will develop across the loading resistor 40 an output voltage which will resemble the voltage wave V of FIG. 4 as the shaft makes a full rotation of 360°. Because of the opposed polarities of the two photocells, however, the two voltage waves will be in opposition to one another; and because the two photocells are spaced 180° from one another around the path of the rotating light radiating surface 15, the two waves will be 180° out of phase relative to one another, in the sense that the two waves reach their maximum amplitudes, relative to zero, with 180° phase difference. The two waves, however, swing positive and negative in step with one another, as will appear.

Thus, in FIG. 7, sinusoidal voltage wave Va, shown in dashed lines, is developed across loading resistor 40 by means of photocell 24', and this voltage wave is shown above the zero voltage axis, with its troughs tangent thereto. Sinusoidal voltage wave Vb, also shown in dashed lines, is developed across loading resistor 40 by means of photocell 24a, and this voltage is then below the zero reference axis, with it crests tangent to the latter. The resultant of these two voltages across the loading resistor is an alternating current voltage wave Vr, symmetrical with respect to the zero voltage axis and obtained, as will be seen, without necessity of the biasing expedient of the one photocell system.

It should be noted that at any zero output point for the combined or resultant output voltage wave, the actual voltage outputs from the photocells are not zero, but equal and opposite, thus cancelling. This causes the output wave zero to occur when the actual light output from the rotatable light radiator is substantial and eliminates small errors which might otherwise occur during wave zero crossover with the photocells essentially dark.

It will be evident that the sine wave generators of the invention produce a sine wave which is a function of shaft position, but is independent of shaft velocity.

Second harmonic distortion, such as appears to be in large part attributable to sweep of reflected light across the photocells, has been virtually eliminated, and what second harmonic distortion remains is a function of adjustment of the positions of the two photocells in the two photocell system. This distortion is reducible to a very insignificant amount.

I have found that the "higher" the photocells are located relative to the normals to the radiating surface 15, in the aspects of FIGS. 1 and 5, the lower is the amount of third harmonic distortion. I find it practicable to place the photocells somewhat above these normals, and thereby attain very low third harmonic distortion. As intimated earlier, the photocells, when placed below these normals, lose sight of the light radiating surface when the latter is facing away from the cells, and clipping occurs. On the other hand, when the photocells are located above the normals, the light radiating surface remains in view of the photocells throughout the cycle. The only disadvantage resulting from this condition is a little loss in output amplitude, which ordinarily is more than compensated for by the resulting reduction in third harmonic distortion.

The use and advantage of the sine wave generator of the invention for many uses as outlined in the introductory portion of this specification will now be apparent to those skilled in the art.

For purpose of phase measurements, two generators on a single shaft, with the "photocell field" of at least one of these generators bodily rotatably adjustable about the axis of the shaft, is of extreme advantage. In FIG. 8 I have illustrated such a system in diagrammatic fashion. The single shaft appears at 50, projecting both ways from a center-located variable speed drive unit 51. The shaft 50 is driven through means in unit 51 from synchronous electric motor 52. The two ends of shaft 50 carry coaxial cylinders 53 and 54 with acute-angled light radiating end faces 55 and 56, respectively, illuminated by diffused light sources generally indicated at 57 and 58, respectively. The faces 55 and 56 are non-reflective and may be coated with white paint. Two photocells 59 and 60 view the light radiating surface 55, and two photocells 61 and 62 view the light radiating surface 56. The geometry is in each case as described in connection with the earlier embodiments of the invention. It will be understood that only one photocell may be associated with each light radiating prism, as in FIGS. 1–4, or two may be used, as here shown, and as described in connection with FIGS. 5 and 6.

The photocells 59 and 60 may be stationarily mounted, or mounted for precision adjustment of their position, but to be stationary during operation. The other two photocells 61 and 62, however, are mounted, in any suitable mechanical fashion, to a frame ring 64, which is arranged for rotative adjustment about the axis of shaft 50. Ring 64 is shown to be marked with suitable 360° scale divisions and subdivisions, as indicated at S. A stationary index arrow 66 is positioned adjacent the scale of ring 64. With this arangement, by easy mechanical adjustment, two sine waves of any predetermined phase difference may be generated, for purposes such as outlined in the introductory part of this specification, and as will readily be comprehended by those skilled in the art.

It will be appreciated that the drawings and description are merely illustrative of and not restrictive on the invention, and that various changes in design, structure and arrangement may be made without departing from the sprit and scope of the invention or of the appended claims.

What is claimed is:
1. In a sine wave generator, the combination of:
   a body having a substantially plane matte light radiating surface thereon,
   means for illuminating said matte surface, whereby said surface radiates diffused light,
   means for rotating said body on an axis intersecting said surface and at an acute angle thereto, and
   a relatively stationary photosensitive light receiver means located in a position to one side of said axis and in the field of said diffused light radiated from said illuminated matte surface, such that the area of the illuminated matte surface viewed by said receiver means varies sinusoidally with the angle of rotation of said body on said axis.

2. The subject matter of claim 1, wherein said means for illuminating said matte surface comprises a diffused light source located opposite said surface and substantially on said axis.

3. The subject matter of claim 2, wherein said photosensitive receiver means surface is located near the normal to said matte surface, erected from the point of intersection of said surface with the axis of rotation.

4. The subject matter of claim 2, wherein said photosensitive receiver means is located inside the cone generated by the normal to said matte surface, erected from the point of intersection of said surface with the axis of rotation, whereby the area of said illuminated matte surface viewed by said photosensitive receiver means is preserved above zero throughout all positions of rotation of said body.

5. The subject matter of claim 1, wherein said photosensitive receiver means comprises a single photocell, and an output circuit for said photocell, whereby said photocell produces across said output circuit a sinusoidal but unidirectional output voltage wave in accordance with the sinusoidally varying area of said illuminated matte surface viewed by said photocell, and said output circuit including means for removing the D.C. component from the sinusoidal output voltage wave of the photocell.

6. The subject matter of claim 1, including an additional photosensitive receiver means, positioned symmetrically with respect to the first-mentioned photosensitive receiver means, on the opposite side of said axis of rotation.

7. In a sine wave generator, the combination of:
   a body having a substantially plane matte light radiating surface thereon,
   means for rotating said body on an axis intersecting said surface and at an acuate angle thereto,
   a diffused light source positioned on said axis opposite said matte surface for casting diffused light thereon, and a pair of stationary photocells located on opposite sides of said axis of rotation, at 180° spacing with respect thereto, and generally adjacent the conical surface generated by a normal to said matte surface on said rotating body, erected from the point of intersection of said matte surface with said axis of rotation, whereby said photocells develop D.C. biased output voltage waves of 180° phase difference.

8. In a sine wave generator, the combination of:

a body having a substantially plane matte light radiating surface thereon, means for rotating said body on an axis intersecting said surface and at an acute angle thereto, a diffused light source positioned on said axis opposite said matter surface for casting diffused light thereon, and a pair of stationary photocells located on opposite sides of said axis of rotation, at 180° spacing with respect thereto, and inside the conical surface generated by a normal to said matte surface on said rotating body, erected from the point of intersection of said matte surface with said axis of rotation, whereby said photocells develop D.C. biased output voltage waves of 180° phase difference.

9. The subject matter of claim 7, together with an output circuit leading from said photocells and combining the D.C. biased sinusoidal output voltage waves therefrom in opposite phase to produce a sinusoidal alternating current voltage wave.

10. The subject matter of claim 8, together with an output circuit leading from said photocells and combining the D.C. biased sinusoidal output voltage waves therefrom in opposite phase to produce a sinusoidal alternating current voltage wave.

11. A pair of sine wave generators as defined in claim 1, including means interconnecting the bodies of said generators to rotate in unison, and means for adjusting the position of the photosensitive receiver means of at least one of said generators around a circular path of adjustment coaxial with the axis of rotation of the corresponding body.

12. A pair of sine wave generators as defined in claim 7, including means interconnecting the bodies of said generators to rotate in unison, and means for bodily adjusting the position of the pair of photocells corresponding to one of said generators around a circular path of adjustment coaxial with the axis of rotation of the corresponding body.

13. A pair of sine wave generators as defined in claim 8, including means interconnecting the bodies of said generators to rotate in unison, and means for bodily adjusting the position of the pair of photocells corresponding to one of said generators around a circular path of adjustment coaxial with the axis of rotation of the corresponding body.

No references cited.

LLOYD McCOLLUM, *Primary Examiner.*